(12) United States Patent
Bleacher et al.

(10) Patent No.: US 9,788,118 B2
(45) Date of Patent: Oct. 10, 2017

(54) SPATIAL SYSTEMS INCLUDING EYE TRACKING CAPABILITIES AND RELATED METHODS

(71) Applicant: Thales Avionics, Inc., Irvine, CA (US)

(72) Inventors: Brett Bleacher, Rancho Santa Margarita, CA (US); Christopher K. Mondragon, Laguna Niguel, CA (US)

(73) Assignee: THALES AVIONICS, INC., Irvine, CA (US)

( * ) Notice: Subject to any disclaimer, the term of this patent is extended or adjusted under 35 U.S.C. 154(b) by 123 days.

(21) Appl. No.: 14/670,480

(22) Filed: Mar. 27, 2015

(65) Prior Publication Data
US 2016/0286316 A1 Sep. 29, 2016

(51) Int. Cl.
H04R 5/02 (2006.01)
H04S 7/00 (2006.01)
G06F 3/01 (2006.01)

(52) U.S. Cl.
CPC ............ H04R 5/023 (2013.01); G06F 3/013 (2013.01); H04S 7/303 (2013.01); H04R 2499/13 (2013.01)

(58) Field of Classification Search
CPC . H04R 5/00; H04R 5/02; H04R 5/023; H04R 2499/00; H04R 2499/13; G06F 3/013; H04S 7/303; H04S 1/002
USPC .......................... 381/300, 301, 302, 304, 305
See application file for complete search history.

(56) References Cited

U.S. PATENT DOCUMENTS

| | | | | |
|---|---|---|---|---|
| 3,885,831 A | * | 5/1975 | Rasmussen | A47C 7/38 297/405 |
| 6,540,299 B1 | * | 4/2003 | Gosk | B60N 2/0252 297/344.1 |
| 7,684,577 B2 | * | 3/2010 | Arai | A47C 7/72 381/302 |
| 8,483,413 B2 | * | 7/2013 | Hartung | H04R 5/02 381/302 |
| 8,928,585 B2 | | 1/2015 | Mondragon et al. | |
| 2002/0089297 A1 | * | 7/2002 | Filo | A63H 11/20 318/568.12 |
| 2003/0142842 A1 | * | 7/2003 | Arai | A47C 7/72 381/300 |
| 2006/0119572 A1 | * | 6/2006 | Lanier | G06F 1/1601 345/156 |
| 2008/0187156 A1 | * | 8/2008 | Yokota | H04R 1/025 381/307 |
| 2008/0273713 A1 | * | 11/2008 | Hartung | H04R 5/02 381/86 |
| 2009/0109036 A1 | * | 4/2009 | Schalla | B64D 11/0015 340/573.1 |
| 2014/0336876 A1 | * | 11/2014 | Gieseke | G06F 3/005 701/36 |

(Continued)

*Primary Examiner* — William A Jerez Lora
(74) *Attorney, Agent, or Firm* — Sage Patent Group

(57) ABSTRACT

Entertainment systems are provided including a plurality of spatial sound speakers embedded in a headrest of a passenger seat and associated with a media player of the entertainment system. A spatial sound controller associated with the plurality of spatial sound speakers of the media player is also provided. The spatial sound controller is configured to provide simulated surround sound associated with the media player to a defined target region. The plurality of spatial sound speakers are adjusted to a position of a passenger seated in the passenger seat based on external input associated with the passenger.

31 Claims, 8 Drawing Sheets

(56) References Cited

U.S. PATENT DOCUMENTS

2016/0023763 A1\* 1/2016 Tracy ............... B64D 11/00154
                                                                                          381/301

\* cited by examiner

SPATIAL SYSTEMS INCLUDING EYE TRACKING CAPABILITIES AND RELATED METHODS

FIELD

Embodiments described herein relate generally to electronic entertainment systems and, more particularly, to sound systems for use in entertainment systems.

BACKGROUND

The approaches described in this section could be pursued, but are not necessarily approaches that have been previously conceived or pursued. Therefore, unless otherwise indicated herein, these approaches are not known to be prior art and are not admitted to be prior art by inclusion in this section.

Spatial is a technology that simulates surround sound. For example, some spatial systems can simulate 5:1 audio surround sound effect using speakers that are not positioned in conventional 5:1 locations. Spatial may help a user better organize their acoustic environment so they can choose which sounds or voices to focus on. Spatial can be used in smaller spaces, such as vehicles, to remove the need for use of earphones or headphones. For example, a listener sitting in a seat of a vehicle would be able to hear the sound when seated, but when the listener steps outside of the seat, the sound may disappear.

Spatial has many advantages over conventional headsets or earphones, which are typically required to listen to audio. Headphones and/or earphones can be uncomfortable when used over a long period of time. When headphones/earphones are intended for use in a public setting, hygiene problems can arise in that these accessories may become unsanitary or unattractive to listeners. Headphone/earphones can be very uncomfortable after wearing them for several hours. Moreover, headphones/earphones are subject to wear, which can diminish their useful life and increase maintenance costs. Furthermore, there is the potential for abuse and damage from vandalism to these accessories.

SUMMARY

Some embodiments of the present inventive concept provide entertainment systems including a plurality of spatial sound speakers embedded in a headrest of a passenger seat and associated with a media player of the entertainment system. A spatial sound controller associated with the plurality of spatial sound speakers of the media player is also provided. The spatial sound controller is configured to provide simulated surround sound associated with the media player to a defined target region. The plurality of spatial sound speakers are adjusted to a position of a passenger seated in the passenger seat based on external input associated with the passenger.

In further embodiments, the headrest including the plurality of speakers may be configured to adjust a position thereof based on the external input associated with the passenger seated in the passenger seat.

In still further embodiments, the headrest including the plurality of spatial sound speakers may include three portions, a center portion and two wing portions. Each of the center portion and two wing portions may be configured to move separately.

In some embodiments, the headrest may be configured to move at least one of up and down; side to side; and forward and backward to adjust to the position of the passenger seated in the passenger seat.

In further embodiments, the two wing portions may be configured to move between a first position, remote from ears of the passenger, to a second position, closer to ears of the passenger.

In still further embodiments, the two wings may be configured to adjust to a plurality of positions between the first position and the second position.

In some embodiments, the headrest including the plurality of spatial sound speakers may be configured to adjust responsive to an external voice input of the passenger.

In further embodiments, the headrest including the plurality of spatial sound speakers may be configured to adjust responsive to an external manual input of the passenger.

In still further embodiments, the headrest including the plurality of spatial sound speakers may be configured to adjust responsive to external eye tracking input from eyes of the passenger.

In some embodiments, the system may further include an eye tracking system comprising at least one eye tracking camera and associated sensors. The eye tracking system may be configured to obtain a location of a passenger's eyes such that a position of the passenger's ears is determined. The headrest may be adjusted responsive to the determination of the position of the passenger's ears.

In further embodiments, the system may be further configured to fine tune the position of the headrest using one of audio input, manual input or a combination thereof.

In still further embodiments, the system may further include a directional microphone. The system may be further configured to obtain a location of a passenger's ears by locating a direction and location of a voice via the directional microphone using microphone triangulation. The system may be further configured to calculate the location of the passenger's ears based on location of a mouth via voice source location.

In some embodiments, the system may further include pressure sensors associated with the passenger seat. The system may be further configured to locate head and ears of the passenger based on information obtained from the pressure sensors.

In further embodiments, the entertainment system may include an in-flight entertainment (IFE) system on an aircraft. The IFE system may be designed to comply with all relevant government and airlines standards.

In still further embodiments, the entertainment system may be integrated with a vehicle. The vehicle may include a train, a bus, a cruise ship and/or a military aircraft.

Some embodiments of the present inventive concept provide an in-flight entertainment (IFE) system for use on an aircraft. The IFE system includes a media player integrated into the aircraft; a plurality of spatial sound speakers embedded in a headrest of a passenger seat associated with the media player of the IFE system; and a spatial sound controller associated with the plurality of spatial sound speakers of the media player, the spatial sound controller being configured to provide simulated surround sound associated with the media player to a defined target region. The plurality of spatial sound speakers are adjusted to a position of a passenger seated in the passenger seat based on external input associated with the passenger.

Further embodiments of the present inventive concept provide methods of providing sound from a media system, the method include positioning at least two spatial sound speakers in a headrest of a passenger seat in a passenger vehicle; and adjusting the headrest including the at least two spatial sound speakers to accommodate a passenger seated in the passenger seat such that a defined target region in which sound is audible is customized for the passenger seated in the passenger seat.

BRIEF DESCRIPTION OF THE DRAWINGS

The accompanying drawings, which are included to provide a further understanding of the disclosure and are incorporated in and constitute a part of this application, illustrate certain non-limiting embodiments of the inventive concept. In the drawings.

DETAILED DESCRIPTION

Figure 1:
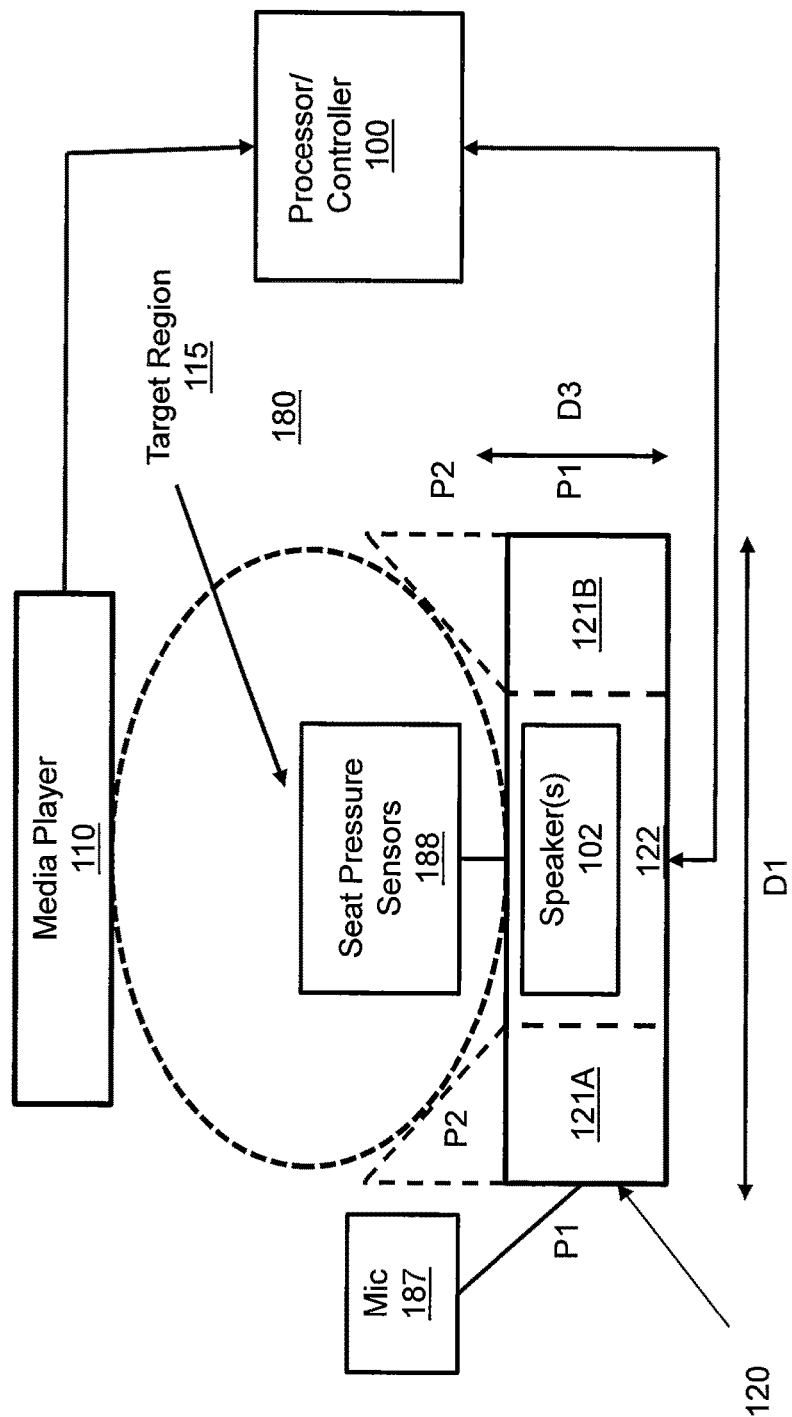
FIG. 1 is a block diagram of a spatial sound system in accordance with some embodiments of the present inventive concept.

The following detailed description discloses various non-limiting example embodiments of the inventive concept. The inventive concept can be embodied in many different forms and is not to be construed as limited to the embodiments set forth herein.

Although various embodiments of the present inventive concept will be discussed herein with respect in-flight entertainment (IFE) systems integrated in a seat of an aircraft, embodiments of the present inventive concept are not limited to this configuration. For example, embodiments of the present inventive concept may be used in any environment that would benefit from the details thereof. For example, embodiments of the present inventive concept may be used in entertainment systems on trains, buses, or cruise ships as well as in military aircrafts for training, briefing and debriefing without departing from the scope of the present inventive concept.

As discussed above, headsets or earphones are typically used to listen to audio, for example, audio provided by an IFE on the aircraft. Use of accessories, such as headphones and earphones, can have disadvantages, for example, these accessories may be uncomfortable when used over a long period of time. Furthermore, when used in a public environment, these accessories may have to be cleaned and maintained by the airlines and handed out and collected by the flight attendants, which can be time consuming. Furthermore, audio jacks connected to the headphones/earphones can break easily due to over use or abuse, which causes an added expense of replacing the headphones/earphones. Some airlines provide headphones/earphones free of charge or for minimal cost, however, the quality of these headphones/earphones is typically very poor.

Accordingly, some embodiments of the present inventive concept provide spatial systems that enable listeners to hear audio presented on a media device without the use of headphones/earphones or similar accessory. As will be discussed herein with respect to FIGS. 1 through 8, in some embodiments, spatial sound technology can be embedded within an aircraft seat configuration whereby the passenger can hear good quality audio sound from the media device without the use of accessories. Embodiments of the present inventive concept may be used in combination with premium, first class, business class and/or coach class seating without departing from the scope of the present inventive concept. In further embodiments, spatial technology may be implemented in combination with eye tracking technology with departing from embodiments of the inventive concept.

Some conventional headsets/earphones or the IFE system itself are connected to include noise cancellation/reduction circuitry to mask aircraft and passenger noise. These noise cancellation/reduction circuits can be built into the IFE hardware or the headphone jack located in, for example, the seatback or seat arm. Spatial surround systems in accordance with embodiments discussed herein may eliminate the need to use utilize headphones or earphones as will be discussed herein.

Referring first to FIG. 1, a spatial system 180 in accordance with some embodiments of the present inventive concept will now be discussed. As illustrated in FIG. 1, the spatial sound system 180 includes a media player 110 having a target region 115, a processor/controller 100, speakers 102, a microphone 187, and seat pressure sensors 188. The speakers 102 of FIG. 1 are illustrated as being positioned in a head rest 122 of a vehicle, however, it will be understood that embodiments of the present invention are not limited to this configuration. The headrest 120 of FIG. 1 includes "wings" 121A and 121B configured to fold in and out between positions P1 and P2. The headrest 120 is also configured to move from side to side (D1), up and down (D2—not show in FIG. 1) and forward and backward (D3).

Referring again to FIG. 1, the speakers 102 are configured to provide simulated surround sound (spatial surround sound) to a person or persons within a target region 115. For example, a target region 115 could be one or more seats in a vehicle, for example, an aircraft. Thus, as used herein "spatial surround sound" refers to sound that simulates surround sound to a target region. For example, in some embodiments, the speakers 102 include four speaker configured to provide 5:1 (three dimensional (3D)) surround sound. Two of the speakers 102 may be directed to the ears of a passenger in the target region 115 and the remaining two may be used for noise reduction and cancellation. In further embodiments, the speakers 102 may be a plurality of speakers, for example, up to 12 speakers on each side of a headrest, seat area or even the side panels. In these embodiments, the speakers 102 may be configured similar to a sound bar. Thus, embodiments of the present inventive concept may provide spatial surround sound (3D, 5:1, 7:1, or 9:1 Spatial Surround Sound) using specialized algorithms and software to produce audio phase shifting to simulate a 5:1/7:1/9:1 audio surround sound effect using at least 2 speakers as will be discussed further herein. It will be understood that embodiments creating 7:1 or 9:1 surround sound may use more than two speakers without departing from the scope of the present inventive concept.

Referring again to FIG. 1, the spatial surround system 180 is configured to provide audio associated with the media player 110 to the target region such that the sound from the media player 110 is only audible by those in the target region 115. As discussed above, the sound appears to be surround sound to the those seated in the target region 115 responsive of algorithms and software in the processor/controller 100 configured to produce audio phase shifting. It will be understood that the sound may be directed to a single person or group of persons without departing from the scope of the present inventive concept. As discussed above, in particular embodiments, sound is directed at a person in a seat of an aircraft as will be discussed further below.

Spatial systems 180 in accordance with some embodiments of the present inventive concept experience less than about 20 dB of leakage outside the passenger seat during operation of the media player. In particular, embodiments system experiences no greater than about 10 dB of leakage during operation of the media player.

In an aircraft environment, while in flight, the aircraft exhibits approximately 70 to 85 dB of noise. Thus, the 20 dB or less of noise leakage experienced by embodiments of the present inventive concept would typically not be audible to the passengers that are outside the target region 115 at which the sound is directed, for example, a passenger seat, during the flight. However, the aircraft noise significantly decreases when the aircraft is on the ground; thus, the least amount of leakage is desirable.

Referring again to FIG. 1, the media player 110 may be, for example, a smart video display unit (SVDU) of an in flight entertainment (IFE) system. Details of the media player 110 will now be discussed with respect to the block diagram of FIG. 2 illustrating example components that may be included in a media player, such as the SVDU according to some embodiments.

Figure 2:
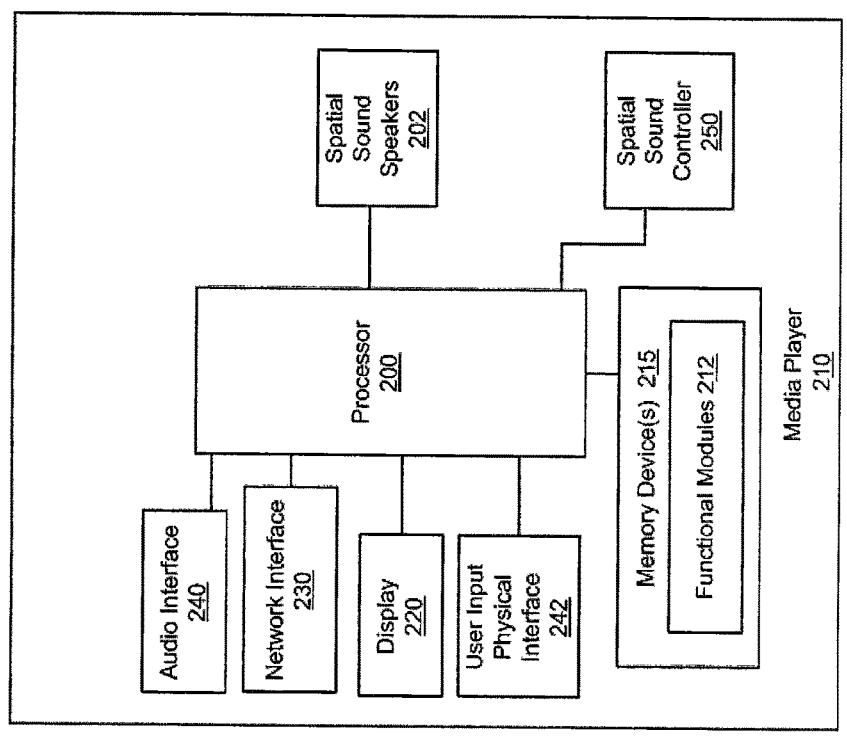
FIG. 2 is a block diagram of a media player in accordance with some embodiments of the present inventive concept.

Referring to FIG. 2, the media player 210 includes a processor 200, memory device(s) 215 that contain functional modules 212, the spatial speakers 202, a display device 220 (e.g., a liquid crystal display which may include a touch-sensitive interface), an audio interface 240, a spatial surround controller 250 and/or a wired or wireless network interface 230. The media device 210 may further include a physical interface 242 (e.g., switches, control wheels, buttons, keypad, keyboard, etc.) that can be manipulated by a passenger to control the media device 210 and other defined components/systems within the aircraft.

The processor 200 includes one or more data processing circuits, such as a general purpose and/or special purpose processor (e.g., microprocessor, FPGA (Field Programmable Array) and/or DSP (digital signal processor)). The processor 200 is configured to execute computer program instructions from the functional modules 212 in the memory device(s) 210, described below as a computer readable medium, to perform some or all of the operations and methods that are described herein for one or more of the embodiments.

The processor 200 may receive music, video, games, data, and application programs through the network interface 230, which it processes for display on the display device 220 and/or for output as audio through the audio interface 240 to, for example, spatial surround sound speakers 202 using the surround sound controller 250 in accordance with embodiments of the present inventive concept.

It will be understood that although the speakers 202 are depicted in FIG. 2 as being part of the headrest 120, these components may be separate without departing from the scope of the present inventive concept.

Figure 3:
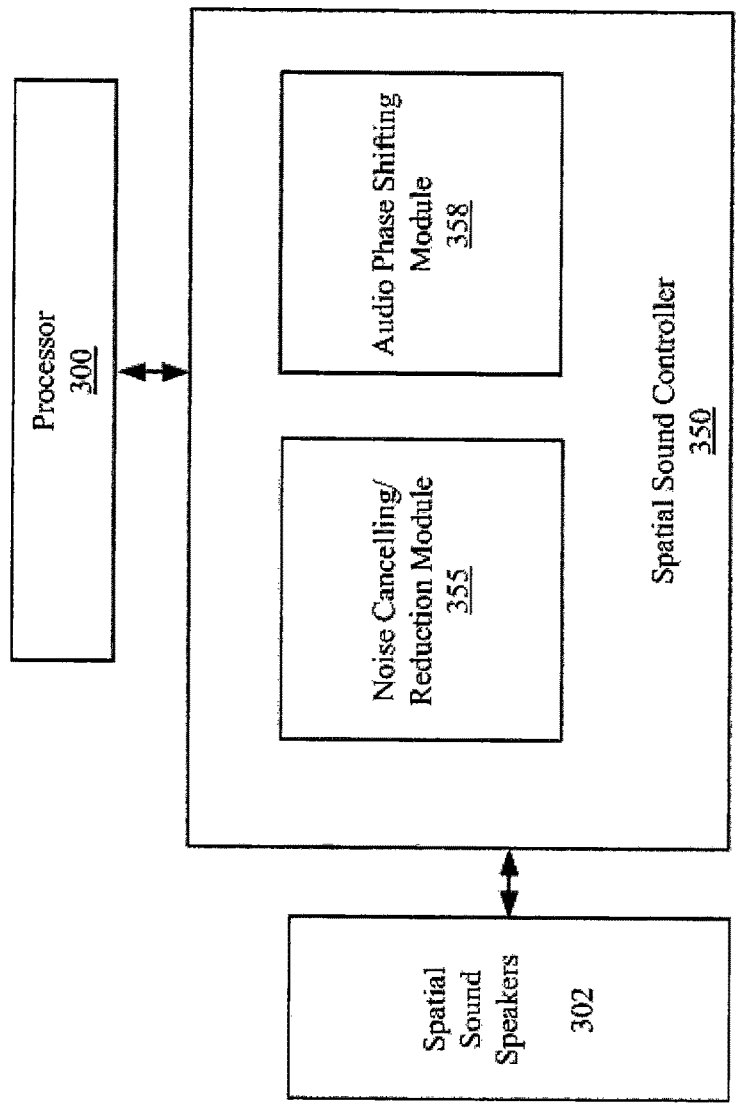
FIG. 3 is a block diagram of a spatial sound controller in accordance with some embodiments of the present inventive concept.

Referring now to FIG. 3, details of the spatial sound controller 350 in accordance with some embodiments of the present inventive concept will be discussed. As illustrated in FIG. 3, the spatial sound controller 350 is coupled to the speakers 302 and the processor 300 discussed above with respect to FIG. 2. The spatial sound controller 350 includes audio phase shaping module 358 and a noise cancelling/reduction module 355.

The spatial sound controller 350 is configured to provide sound associated with the media player to a passenger/passengers such that the sound is only audible by the passenger/passengers and appears to be surround (3D or 5:1,7:1 or 9:1) sound.

In particular embodiments, the audio shaping module 358 may be configured to execute software algorithms to produce audio phase shifting to simulate 5:1,7:1,9:1 (3D) audio surround sound. The noise cancelling/reduction module 355 is configured to reduce sound leakage. As discussed above, in some embodiments the leakage may be no greater than about 10 dB.

It will also be understood that in some embodiments, the noise cancelling/reduction module 355 may be configured to produce substantial or possibly total silence without departing from the scope of the present inventive concept.

As discussed above, some embodiments of the spatial sound system discussed herein can be used in combination with an IFE system of an aircraft. However, embodiments of the present inventive concept are not limited to this configuration. For example, embodiments of the present inventive concept may be used in other vehicles, such as a car, a train, a bus, a cruise ship and a military aircraft without departing from the scope of the present inventive concept.

Figure 4:
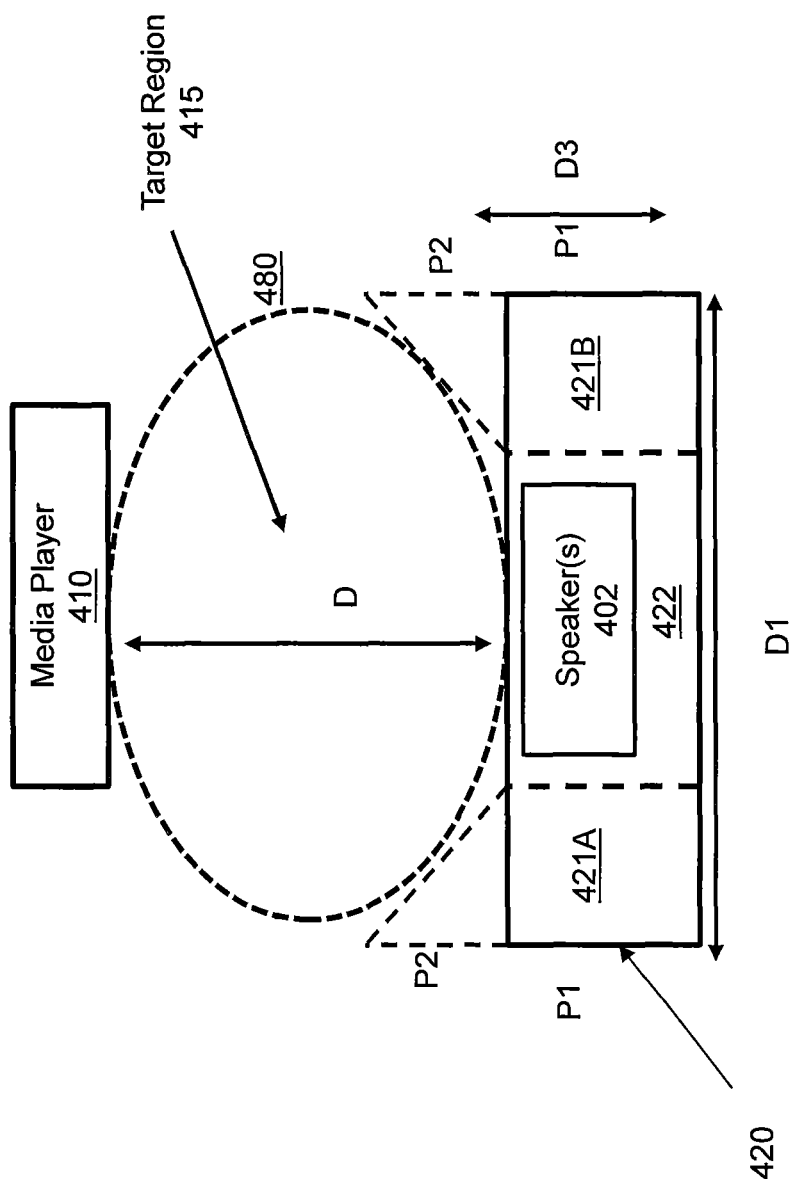
FIG. 4 is a block diagram of a top view of a system including a media player and a headrest in accordance with embodiments of the present inventive concept.

Referring now to FIG. 4, embodiments of the present inventive concept integrated in an IFE system of an aircraft will be discussed. The aircraft environment presents a unique issue for spatial sound applications due to the close proximity of passengers. Referring to FIG. 4, a block diagram of a spatial sound system 480 in accordance with some embodiments will be discussed. As illustrated therein, the system 480 includes a media player 410, a headrest 420 and a target region 480 as discussed above with respect to FIG. 1. As illustrated, the distance between the media player 410 and the target region 415, or in this case, the passenger seated in the seat of the aircraft, is very small. For example, for a business class seat the distance D may be from about 3.0 to about 6.0 feet. In a coach class seat, this distance D may only be about 1.5 to 2.5 feet. Thus, in a coach class seat, a reduction in size of the spatial sound speakers and a modified controller to shorten the range (less than 1.5 feet) may be needed.

As discussed above, in some embodiments the media player 410 and the speakers 402 are integrated in the seat on an aircraft. In some embodiments, the seats may be made of sound absorbing materials. Although not discussed in detail herein, some embodiments include a hood (sound dome) that can be to create a cone of sound for the passenger seated in the seat. In these embodiments, this hood may be made of Plexiglas. Furthermore, the spatial surround system in accordance with some embodiments may be used in a common area of the aircraft without departing from the scope of the present inventive concept.

It will be understood that sound systems in accordance with embodiments discussed herein are configured to be in compliance with Federal Aviation Administration (FAA), Airbus and Boeing environment and electrical/environmental certification including flammability and Electromagnetc Interference (EMI).

Referring again to FIG. 4, in some embodiments of the present inventive concept the spatial sound speakers 402 may be included in the headrest of the passenger's seat. Placing the speakers 402 therein may allow for adjustment of the headrest 420 to adapt to the height and/or size of the passenger and improve the target region 415 of the spatial sound system 480 as will be discussed further below with respect to FIGS. 4 through 9. The spatial sound speakers 402 may also be located in other areas of the airline seat enclosure, for example, in the side panels of a business class seat, or in other parts of the seat enclosure to cover all reclining positions while sleeping or resting.

In particular, FIG. 4 a top view of a system including spatial sound speakers embedded in the headrest 420 of a passenger seat. As illustrated therein, the system 480, which may be part of an IFE system, includes a media player 410 and spatial surround speakers 402 embedded in a headrest 420 of a passenger seat. As illustrated in FIG. 4, the spatial sound speakers 402 are in the headrest 420. The headrest 420 has three portions, a center portion 422 and two end portions 421A/421B (wings). The two end portions (wings) 421A and 421B may be configured to move between a first position P1 and a second position P2 to wrap around the passenger's head. Thus, in embodiments where the speakers are embedded in the wings 421A/421B, the speakers 402 are moved closer to the passenger's head/ear. It will be understood that the wings 421A/421B may have more than two positions P1 and P2, for example, there may be infinite positions therebetween depending on the size and shape of the passenger's head. As further illustrated in FIG. 4, the headrest may be further configured to move side to side (direction D1), up and down (FIG. 5A—direction D2) and forward and backward (direction D3) to further adjust to the passenger's head as will be discussed further below.

Although the spatial sound speakers 402 are illustrated positioned in the headrest 420, it will be understood that embodiments of the present inventive concept are not limited to this configuration. In particular, as discussed above, in some embodiments up to 12 speakers like a sound bar may be positioned on or near the headrest 420 without departing from the scope of the present inventive concept. In some embodiments, the system 480 may be implement with four speaker, two on opposite ends of the headrest 420 in the wings 421A and 421B and two for noise cancellation and the like. Thus, in these embodiments, as discussed above, when the wings 421A and 421B are adjusted, the speakers 402 may be moved closer to the passenger's ears/head.

Furthermore, although the media player 410 and the speakers 402 are illustrated as separate components, these components can be combined into one integrated device without departing from the scope of the inventive concept. It will be understood that the size/shape of the speakers 402 may be modified to fit within headrest 420 and/or wings 421A/421B without departing from the scope of the present inventive concept.

The spatial sound system 480 is configured to provide a user with a "simulated surround sound" experience in a target region 415, such that the sound is only audible within the target region 415. The target region could be, for example, a person or group of persons. In particular embodiments, the target region could be a person in a seat of an aircraft as will be discussed further below.

Referring again to FIG. 4, the media player 410 may be, for example, a smart video display unit (SVDU) of an IFE system. Details of the media player 410 are discussed above with respect to FIG. 2 and will not be repeated herein in the interest of brevity.

Figure 5A:
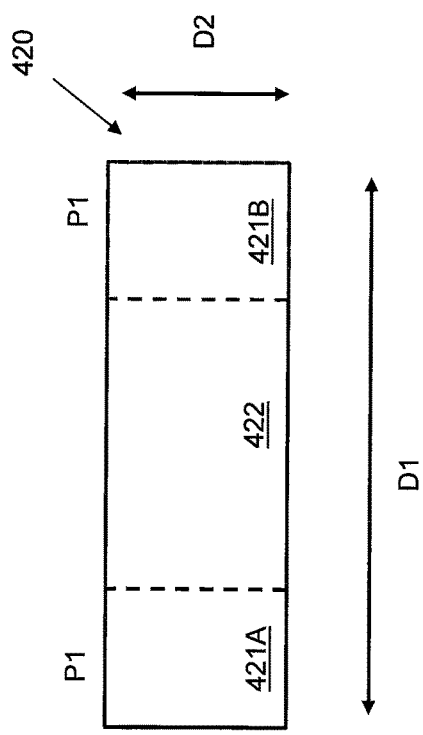
FIGS. 5A and 5B are a front and top view, respectively, of a media headrest in accordance with some embodiments of the present inventive concept.
Figure 5B:
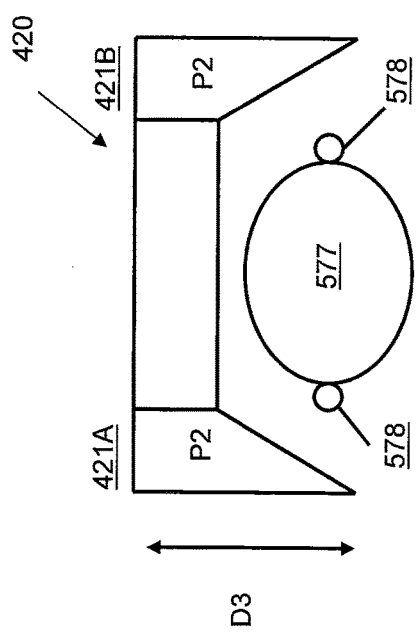

Referring now to FIGS. 5A and 5B, block diagrams of headrests including embedded speakers according to embodiments of the present inventive concept will be discussed. Referring first to FIG. 5A, a front view of a headrest 420 having three portions, a center 422 and two wings 421A and 421B will be discussed. As illustrated therein, the wings 421A and 421B are in a first position P1 and the headrest 420 may be configured to move from side to side (D1) and up and down (D2).

Referring now to FIG. 5B, a top view of the headrest 420 will be discussed. As illustrated therein, the wings 421A and 421B are in a folded in second position (P2) which moves them closed to the passenger's head 577 and ears 578. Thus, allowing the spatial sound speakers 402 to create a target region 415 for the passenger. As further illustrated in FIG. 5B, the headrest may also be configured to move forward and backward (D3). Thus, according to embodiments of the present inventive concept a headrest 420 may be repositioned (side to side, up and down, forward and backward) and wings 421A and 421B portions of the headrest 420 may be moved between positions P1, P2 and there between, to customize the position of the speakers 402 to the passenger's head 577 and ears 578. Each of the movements of the headrest 420 is independent of the other. Thus, the headrest 420 may be moved in any of the directions D1, D2 and D3 or any combination thereof without departing from the scope of the present inventive concept.

As will be discussed further herein, the headrest 420 may be configured to move automatically responsive to eye tracking technologies; responsive to voice commands received by a directional microphone; responsive to voice location via triangulation of the voice by directional microphones thereby locating the head; responsive to manual input by the passenger; responsive to seat sensor location of the head and/or any combination thereof as will be discussed further below with respect to FIGS. 6 through 8.

Figure 6:
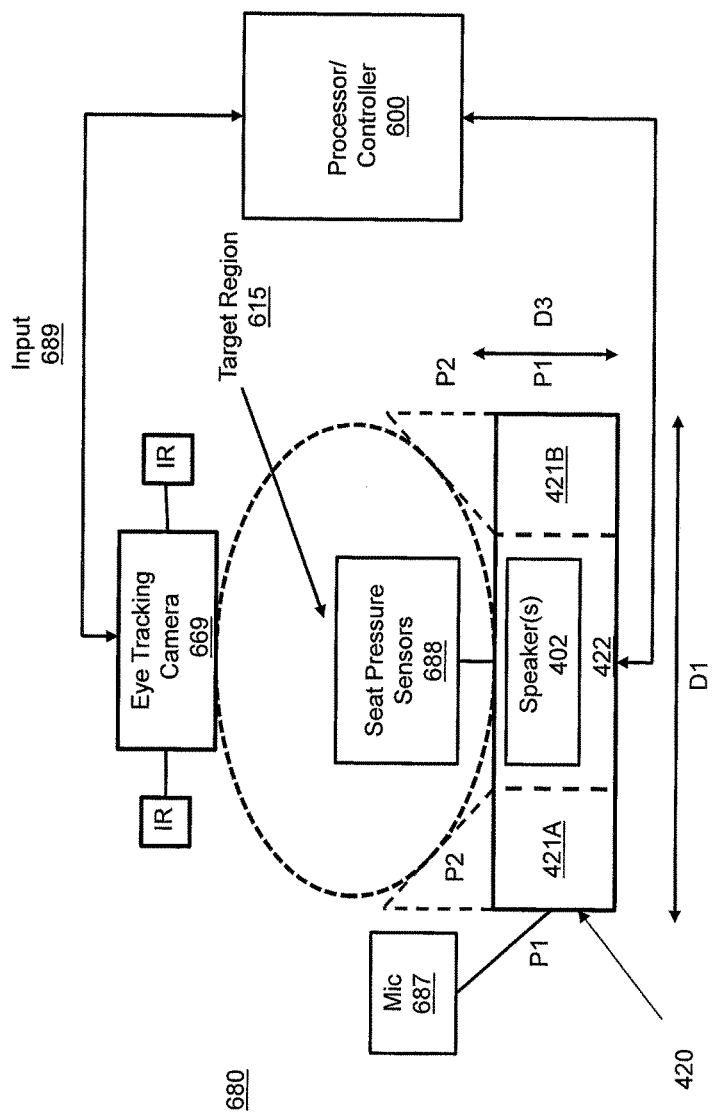
FIG. 6 is a block diagram of a system including a headrest and eye tracking in accordance with some embodiments of the present inventive concept.

Referring now to FIG. 6, a block diagram illustrating an external input 689 for manipulating the headrest will be discussed. As will be understood by those having skill in the art, the processor/controller 600 may be a same processor as illustrated in FIGS. 1-3 above and may be configured with respect to embodiments of the present inventive concept discussed with respect to FIGS. 4-8. Thus, this processor/controller 600 may be included in the media player or may be separate therefrom without departing from the scope of the present inventive concept.

As illustrated in FIG. 6, the headrest 420 may be manipulated responsive to external input 689. Embodiments of the present inventive concept illustrate the external input 689 as including input from an eye tracking camera 669. However, embodiments of the present inventive concept are not limited to this configuration. For example, input 689 may be a voice of a passenger/user received at a directional microphone 687. In particular, the directional microphone 687 could be configured to recognize a voice command stated by a passenger and adjust the headrest 420 responsive thereto. Voice commands may also be used to control other aspects of the IFE system without departing from the scope of the present inventive concept.

The input 689 may be a manual input provided by the passenger via, for example, a toggle switch on an arm rest or a digital interface on the media player. The input 689 may also be through an eye tracking 669 or seat pressure sensor 688 mechanism that would automatically adjust the headrest 420 and the wings 421A and 421B thereof responsive to the signals received through the eye tracking 689 or seat pressure sensor 688 mechanism, details of which will be discussed further below. It will also be understood that the headrest 420 may be adjusted responsive to one or more of these inputs and/or any other input that is capable of communicating with the headrest in accordance with embodiments discussed herein.

As illustrated in FIG. 6, the input to headrest 420 is provided through the processor/control 600 from an eye tracking camera 689 and associated infrared sensors (IR). Thus, in some embodiments, when a passenger sits in the seat, the eye tracking camera 669 and sensors (IR) may be configured to locate eyes of the passenger. This information may be input into the processor/controller 600 and may be used to determine a location of the passenger's ears. For example, in some embodiments, a cursor may be pictures on a display and the passenger will be instructed to look at the cursor and the eye tracking camera and sensors will locate the position of the passenger's eye. By way of further example, the position of the passenger's ears may be determined via facial recognition. The headrest 420 may automatically adjust in the various directions D1, D2 and D3 based on the determined position of the passenger's ears to obtain a better position to provide spatial sound in accordance with embodiments discussed herein.

It will be understood that once the position of the headrest is automatically adjusted, the passenger may further manually adjust the position of the headrest to optimize the location thereof. Furthermore, in some embodiments, the system may be configured to conduct a sound test, the results of which may be used to further adjust the position of the headrest 420. For example, an audio test signal may be provided to the passenger and the passenger could either manually adjust the headrest location or it may be automatically adjusted responsive to the test signal.

Figure 7:
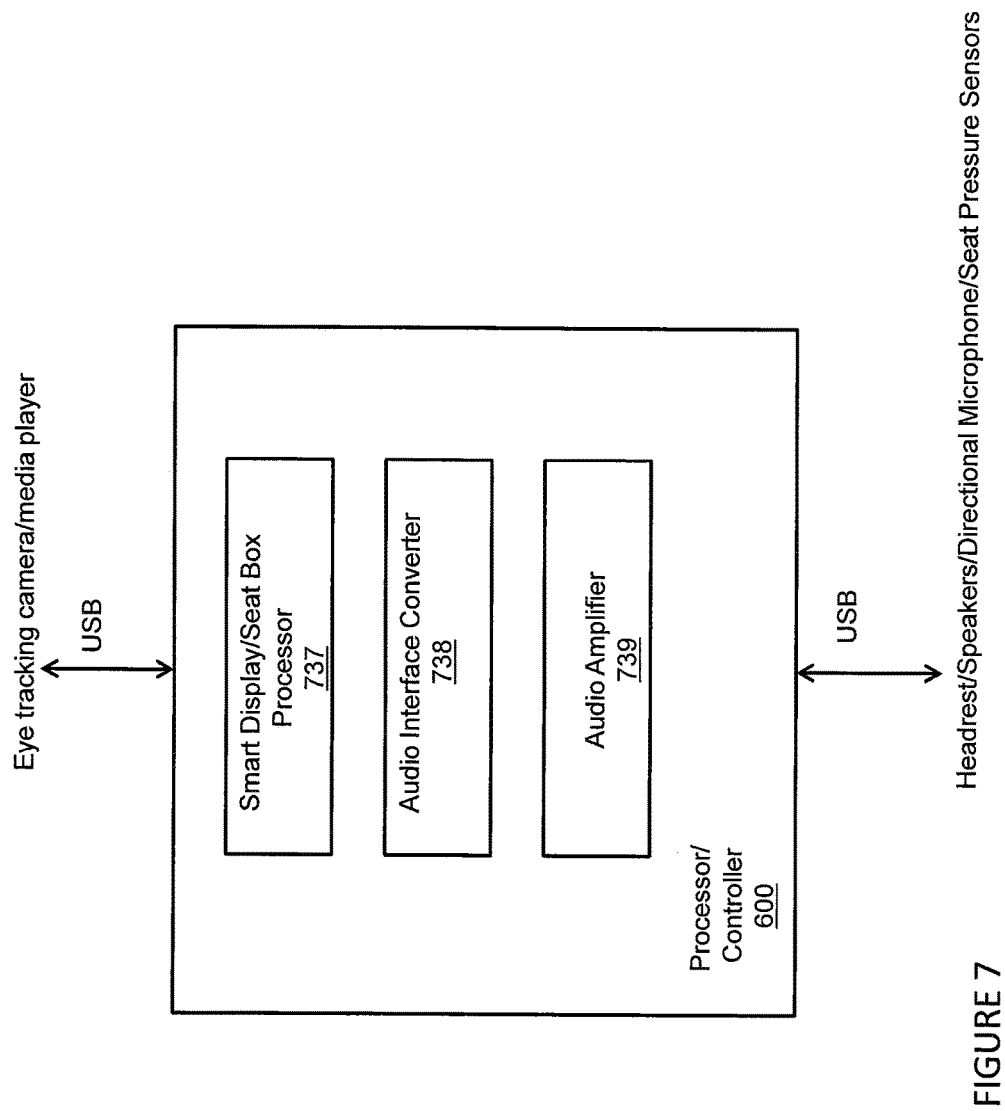
FIG. 7 is a block diagram illustrating a processor in accordance with some embodiments of the present inventive concept.

Referring now to FIG. 7, embodiments of the processor/controller 600 in accordance with embodiments of the present inventive concept will be discussed. As illustrated therein, the processor/controller 600 may include a smart display/seat box processor 737, an audio interface controller 738 and an audio amplifier 739. As further illustrated, the processor 600 communicates with the media player, eye tracking camera, seat pressure sensors, headrest, speakers and directional microphone discussed above.

In particular, the data obtained by the eye tracking camera or seat pressure sensors may be communicated to the processor 737, which may determine a height of the passenger's ears therefrom and automatically adjust the headrest responsive thereto. As discussed above, manual and audio input may also be received by the processor and used to adjust the headrest.

As further illustrated in FIG. 7, the audio amplifier 739 in combination with the audio interface convertor 738 may be configured to receive signals from the speakers as well as the directional microphone and this information may be used to further adjust the headrest as well as control various aspect of the IFE system.

Eye tracking in accordance with embodiments of the present inventive concept may be accomplished using any method of eye tracking capable of achieving aspects of the present inventive concept. For example, eye tracking in a vehicle environment is discussed in commonly assigned U.S. application Ser. No. 13/605,176 entitled, Eye Tracking Control of Vehicle Entertainment Systems, the contents of which are hereby incorporated herein by reference as if set forth in its entirety.

Figure 8:
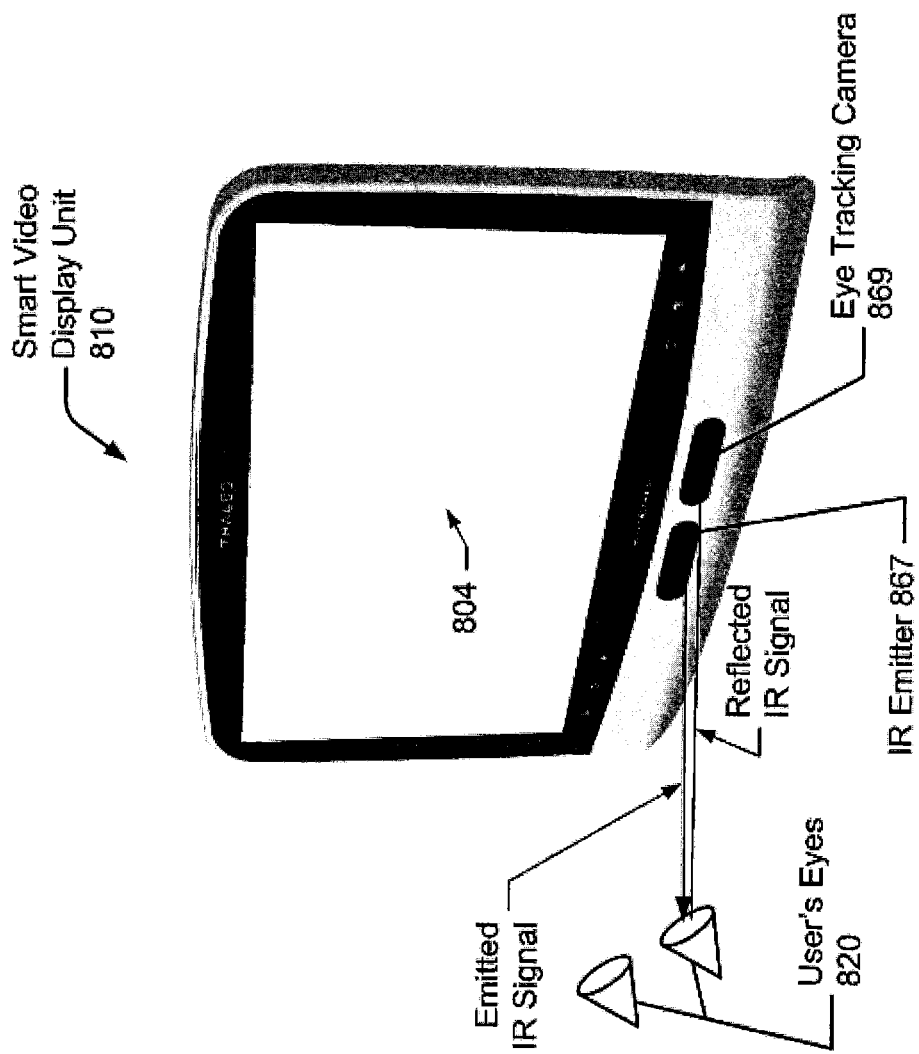
FIG. 8 is block diagram of a media player having an eye tracker in accordance with some embodiments of the present inventive concept.

Referring to FIG. 8, a diagram of an eye tracking system incorporated into a media player in according with some embodiments of the present inventive concept will be discussed. As illustrated in FIG. 8, a smart video display unit 810 has a display surface 804 and is configured to display images to a user/passenger. The SVDU 810 has an eye tracking interface in accordance with embodiments discussed herein that can determine a location of a passenger's eyes on their face, which information can be used in accordance with embodiments discussed herein to located a passenger's ears and adjust the headrest accordingly.

As illustrated, in some embodiments, the eye tracking interface includes at least one eye tracking camera 869 and at least one light emitter 867. The light emitter 867 is configured to illuminate the eyes 820 of a user/passenger who is seated facing the SVDU 810.

In some embodiments, the light emitter 867 can be an infrared (IR) light emitter which can provide advantages over a visible light emitter, including: 1) can be directed toward a person's eyes without annoyance; 2) can be used without disturbing a darkened vehicle environment; 3) provides high reflectively from pupils of eyes; 4) more easily distinguished from other ambient lighting sources in a vehicle environment; and 5) the IR emitter can be increased in intensity to compensate for bright generated light or sunlight within the cabin interior.

The emitted brightness of the light emitter 867 may be controlled (e.g., by the processor 600) to increase in response to sensing higher levels of background brightness (e.g., sensed via the video signal from the camera(s) 869), and to decrease in response to sensing lower levels of background brightness. Thus, for example, while a user's face is brightly lit by sunlight (as sensed via the video signal), the light emitter 867 can be controlled to output a brighter (higher illumination output) light toward the user's face to compensate for the effects on sunlight (e.g., washed out eye's relative to the face within the video signal) and, thereby, enable accurate tracking of the user's eyes.

The emitted IR light is reflect by the person's eyes (e.g., reflected by the cornea and lens) and returned to the eye tracking camera 869. The eye tracking camera 869 and associated circuitry can identify a location of the eyes of the passenger, and can determine a location of the passenger's ears based on this information.

Although embodiments herein are primarily described in the context of an In-Flight Entertainment (IFE) system within an aircraft user cabin, embodiments of the present inventive concept are not limited thereto. Instead, embodiments may be used to provide other types of entertainment systems for trains, automobiles, homes, cruise ships, buses, military transport aircraft, or other environments. Moreover, although some embodiments are described as using a single camera 869, the invention is not limited thereto and may be used with any number of cameras without departing from the scope of the present inventive concept.

As discussed briefly above, some embodiments of the present inventive concept provide spatial sound speakers in a headrest of the passenger seat. The headrest may be adjusted to improve the target region of the spatial sound speakers. As discussed above, in some embodiment, the headrest may be automatically adjusted based on input from an eye tracking or seat pressure sensor device. By providing a more efficient target region, passengers may be afforded more privacy while traveling. For example, passengers may be able to communicate seat to seat via Video/Audio chat without disturbing other passengers or exposing their personal conversation to strangers.

In the above-description of various embodiments of the present inventive concept, it is to be understood that the terminology used herein is for the purpose of describing particular embodiments only and is not intended to be limiting of the inventive concept. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present inventive concept may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concept. All such variations and modifications are intended to be included herein within the scope of the present inventive concept.

That which is claimed is:

1. An entertainment system comprising:
a plurality of spatial sound speakers embedded in a headrest of a passenger seat and associated with a media player of the entertainment system; and
a spatial sound controller connected to receive signals from a media player of the entertainment system and configured to provide signals to the spatial sound speakers to direct simulated surround sound beams to a defined target region, the spatial sound controller is configured to control physical movement of the headrest containing the spatial sound speakers to move the defined target region relative to a passenger's ears responsive to eye tracking input from an eye tracking system that tracks location of the passenger's eyes.

2. The entertainment system of claim 1:
wherein the headrest including the plurality of spatial sound speakers comprises three portions, a center portion and two wing portions, wherein the spatial sound speakers are located in the two wing portions;
wherein each of the center portion and two wing portions are configured to move separately; and
wherein the spatial sound controller is configured to move a location of the defined target region by moving the two wing portions relative to the center portion of the headrest responsive to the eye tracking input from the eye tracking system.

3. The entertainment system of claim 2, wherein the headrest is configured to move at least one of up and down; side to side; and forward and backward to adjust to a position of a passenger seated in the passenger seat, and the spatial sound controller is configured to move the headrest responsive to the eye tracking input from the eye tracking system.

4. The entertainment system of claim 2, wherein the spatial sound controller is configured to move the two wing portions between a first position, remote from ears of the passenger, to a second position, closer to ears of the passenger responsive to the eye tracking input from the eye tracking system.

5. The entertainment system of claim 4, wherein the two wings are configured to adjust to a plurality of positions between the first position and the second position.

6. The entertainment system of claim 1, wherein the spatial sound controller is further configured to move the headrest including the plurality of spatial sound speakers to move the defined target region relative to a passenger's ears responsive to receiving an external voice input of the passenger.

7. The entertainment system of claim 1, wherein the headrest including the plurality of spatial sound speakers is configured to adjust responsive to an external manual input of the passenger.

8. The entertainment system of claim 1,
wherein the eye tracking system comprises at least one eye tracking camera,
wherein the eye tracking system is configured to obtain a location of a passenger's eyes such that a position of the passenger's ear is determined; and
wherein a location of the defined target region is adjusted by the spatial sound controller responsive to the determination of the position of the passenger's eyes so the ears are located within the defined target region.

9. The entertainment system of claim 8, wherein the entertainment system is further configured to fine tune the position of the headrest using one of audio input, manual input or a combination thereof.

10. The entertainment system of claim 1:
wherein the entertainment system further comprises a directional microphone;
wherein the entertainment system is further configured to obtain a location of a passenger's ears by determining a direction of a voice using signals from the directional microphone;
wherein the entertainment system is further configured to calculate the location of the passenger's ears based on the direction of the voice; and
wherein the spatial sound controller is further configured to control physical movement of the spatial sound speakers to move the defined target region relative to a passenger's ears responsive to the calculated location of the passenger's ears.

11. The entertainment system of claim 1:
wherein the entertainment system further comprises pressure sensors associated with the passenger seat; and
wherein the spatial sound controller is further configured to control physical movement of the spatial sound speakers to move the defined target region relative to a passenger's ears responsive to information obtained from the pressure sensors.

12. The entertainment system of claim 1, wherein the entertainment system comprises an in-flight entertainment (IFE) system on an aircraft.

13. The entertainment system of claim 12, wherein the IFE system is designed to comply with all relevant government and airlines standards.

14. The entertainment system of claim 1, wherein the entertainment system is integrated with a vehicle.

15. The entertainment system of claim 14, wherein the vehicle comprises a train, a bus, a cruise ship and/or a military aircraft.

16. An in-flight entertainment (IFE) system for use on an aircraft, the IFE system comprising:
a media player integrated into the aircraft;
a plurality of spatial sound speakers embedded in a headrest of a passenger seat associated with the media player of the IFE system; and
a spatial sound controller connected to receive signals from the media player of the IFE system and configured to provide signals to the spatial sound speakers to direct simulated surround sound beams to a defined target region, the spatial sound controller is configured to control physical movement of the headrest containing the spatial sound speakers to move the defined target region relative to a passenger's ears responsive to eye tracking input from an eye tracking system that tracks location of the passenger's eyes.

17. The IFE system of claim 16:
wherein the headrest including the plurality of spatial sound speakers comprises three portions, a center portion and two wing portions, wherein the spatial sound speakers are located in the two wing portions;
wherein each of the center portion and two wing portions are configured to move separately; and
wherein the spatial sound controller is configured to move a location of the defined target region by moving the two wing portions relative to the center portion of the headrest responsive to the eye tracking input from the eye tracking system.

18. The IFE system of claim 17, wherein the headrest is configured to move at least one of up and down; side to side; and forward and backward to adjust to a position of a passenger seated in the passenger seat, and the spatial sound controller is configured to move the headrest responsive to the eye tracking input from the eye tracking system.

19. The IFE system of claim 17, wherein the spatial sound controller is configured to move the two wing portions between a first position, remote from ears of the passenger, to a second position, closer to ears of the passenger responsive to the eye tracking input from the eye tracking system.

20. The IFE system of claim 19, wherein the two wings are configured to adjust to a plurality of positions between the first position and the second position.

21. The IFE system of claim 16,
wherein the eye tracking system comprises at least one eye tracking camera,
wherein the eye tracking system is configured to obtain a location of a passenger's eyes such that a position of the passenger's ear is determined; and
wherein a location of the defined target region is adjusted by the spatial sound controller responsive to the determination of the position of the passenger's eyes so the ears are located within the defined target region.

22. The IFE system of claim 21, wherein the system is further configured to fine tune the position of the headrest using one of audio input, manual input or a combination thereof.

23. A method of providing sound from a media system, the method comprising:
operating a spatial sound controller connected to receive signals from a media player of the media system, to
provide signals to a plurality of spatial sound speakers embedded in a headrest of a passenger seat to direct simulated surround sound beams to a defined target region, and
control physical movement of the headrest containing the spatial sound speakers to move the defined target region relative to a passenger's ears responsive to eye tracking input from an eye tracking system that tracks location of the passenger's eyes.

24. The method of claim 23:
wherein the headrest including the at least spatial sound speakers comprises three portions, a center portion and two wing portions, wherein the spatial sound speakers are located in the two wing portions; and
wherein operating the spatial sound controller comprises operating the spatial sound controller to move a location of the defined target region by moving the two wing portions relative to the center portion of the headrest responsive to the eye tracking input from the eye tracking system.

25. The method of claim 24,
wherein the headrest is configured to move at least one of up and down; side to side, and
wherein operating the spatial sound controller comprises operating the spatial sound controller to move the headrest responsive to the eye tracking input from the eye tracking system.

26. The method of claim 24, wherein operating the spatial sound controller comprises operating the spatial sound controller to move the two wing portions between a first position, remote from ears of the passenger, to a second position, closer to ears of the passenger responsive to the eye tracking input from the eye tracking system.

27. The method of claim 26, further comprising moving the two wings to one of a plurality of positions between the first position and the second position.

28. The method of claim 22,
wherein the eye tracking system comprises at least one eye tracking camera,
wherein the eye tracking system is configured to obtain a location of a passenger's eyes such that a position of the passenger's ear is determined; and
wherein operating the spatial sound controller comprises operating the spatial sound controller to adjust a location of the defined target region responsive to the determination of the location of the passenger's eyes so the ears are located within the defined target region.

29. The method of claim 28, further comprising fine tuning the position of the headrest using one of audio input, manual input or a combination thereof.

30. The method of claim 23, further comprising:
obtaining a location of a passenger's ears by determining a direction of a voice using signals from a directional microphone; and
calculating the location of the passenger's ears based on the direction of the voice; and
wherein operating the spatial sound controller comprises operating the spatial sound controller to control physical movement of the spatial sound speakers to move the defined target region relative to a passenger's ears responsive to the calculated location of the passenger's ears.

31. The method of claim 23,
wherein the media system further comprises pressure sensors associated with the passenger seat; and
wherein operating the spatial sound controller comprises operating the spatial sound controller to control physical movement of the spatial sound speakers to move the defined target region relative to a passenger's ears responsive to information obtained from the pressure sensors.

* * * * *